UNITED STATES PATENT OFFICE.

JULIUS HAUSER, OF LOS ANGELES, CALIFORNIA.

PROCESS OF INDELIBLY MARKING MEATS.

958,960. Specification of Letters Patent. Patented May 24, 1910.

No Drawing. Application filed March 16, 1905. Serial No. 250,440.

*To all whom it may concern:*

Be it known that I, JULIUS HAUSER, a citizen of the United States, residing at Los Angeles, in the county of Los Angeles and State of California, have invented a certain new and useful Process of Indelibly Marking Meats, of which the following is a specification.

The purpose of this invention is to provide cured meats, as salted or smoked pork, or other meats, with a clear, permanent mark for the purpose of distinguishing the same.

I have discovered that the skin of meats may be indelibly marked in a clear and permanent manner without liability of blurring, running, or washing off through the operations of pickling or curing the meat, and that this may be done by subjecting the skin of the meat that is to be marked, to the action of the usual solution of chlorid of sodium known as salt brine, and to a composition composed of hydrochlorate of nitrobenzene, muriatic acid and a suitable vehicle, as glycerin. I regard indulin and nigrosin as substantial equivalents for this purpose, of hydrochlorate of nitrobenzene. The muriatic acid may be chemically pure, of a strength of about 31%. The exact proportions employed are not deemed essential, but I have used satisfactorily a composition composed of indulin with ½ ounce, fluid, of muriatic acid, and three ounces, fluid, of glycerin. The equivalents may be used in substantially the same proportions, but the proportions may be varied.

I do not assume to give the chemical reactions that occur, but I find the results to be substantially the same in any case when the ingredient known as indulin, that known as nigrosin, or that known as hydrochlorate of nitrobenzene is used in forming the marking composition stated.

The pork or other meat may be first pickled in the usual salt brine or chlorid of sodium solution, and may then be taken from the brine and the skin to be marked may be quickly scraped or wiped to remove the surface brine. The marking composition may then be applied either by a rubber stamp, stencil, or other preferred device, to the surface thus prepared, and the meat may then be smoked or dried. The salt brine upon coming into contact with said composition applied to the skin, does not cause the marking to run or blur. When the composition above stated is applied to the skin of pork or other meat, it penetrates the skin from the surface thereof to the fatty surface inside the skin.

The meat treated with the branding composition and the chlorid of sodium solution, is permanently marked, and the meat may then be smoked or dried. Smoking the marked meat brings out the marking with great clearness.

The branding compound almost instantaneously penetrates the skin of the pork, and it will be found impossible to obliterate the marking from the salted skin, either by scraping or washing, unless the portion marked is cut or entirely scraped away.

With this process a clear branding or marking is insured, and great rapidity of operation can be effectuated, saving time and labor as well as expense. By treating the meat with chlorid of sodium and the composition stated, the marking is accomplished without any unsatisfactory blurring, and is practically permanent. By further treatment by smoking, the marking is completely set and fixed.

I am not at present able to state the chemical changes that take place to effect the result, but it is well understood that creosote is an agent active in the process of smoking meat.

I claim:—

1. The process substantially as set forth of indelibly marking meats, which consists in subjecting the portions of the skin of the meat to be marked to the action of sodium-chlorid solution and also to the action of a compound of hydrochlorate of nitrobenzene, muriatic acid and a suitable vehicle.

2. The process of indelibly marking meats, which consists in subjecting the same to chlorid of sodium solution, removing excess moisture from the surface to be marked, and then marking such surface with a composition of hydrochlorate of nitrobenzene, muriatic acid, and glycerin.

3. The process of indelibly marking meats, which consists in first subjecting the same to a salt brine, removing excess moisture from the surface to be marked, and imprinting such surface with a composition of hydrochlorate of nitrobenzene, muriatic acid and glycerin, and smoking the same.

4. The process of indelibly marking pork, which consists in subjecting the same to a salt brine, imprinting the skin with a composition of hydrochlorate of nitrobenzene, muriatic acid and glycerin, and then smoking the same.

5. The process of indelibly marking pork, which consists in subjecting the same to a salt brine, imprinting the skin with a composition of hydrochlorate of nitrobenzene, muriatic acid and a vehicle, and then smoking the same.

6. The process substantially as set forth of indelibly marking meats, which consists in treating the skin thereof at the part to be marked, with chlorid of sodium, and with a composition of hydrochlorate of nitrobenzene, muriatic acid, and a suitable vehicle and then treating it with creosote.

In testimony whereof, I have hereunto set my hand at Los Angeles, California, this 10th day of March 1905.

JULIUS HAUSER.

In presence of—
FREDERICK S. LYON,
JULIA TOWNSEND.